Figure 1:
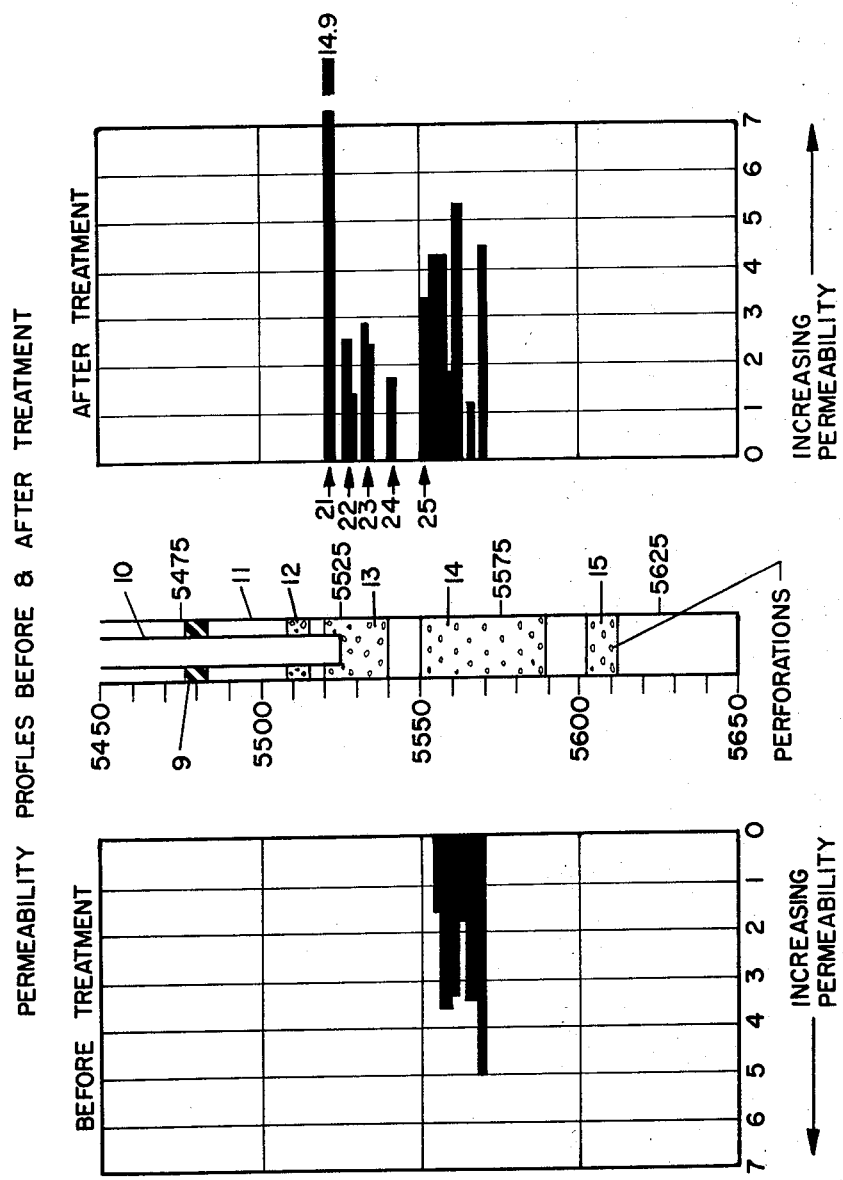

June 10, 1958 J. B. CLARK, JR., ET AL 2,838,116
PRODUCING MULTIPLE FRACTURES IN A
FORMATION PENETRATED BY A WELL
Filed Oct. 22, 1956 2 Sheets-Sheet 1

INVENTORS
JOSEPH B. CLARK, JR.
GEORGE C. HOWARD
CLARENCE R. FAST

BY
ATTORNEY

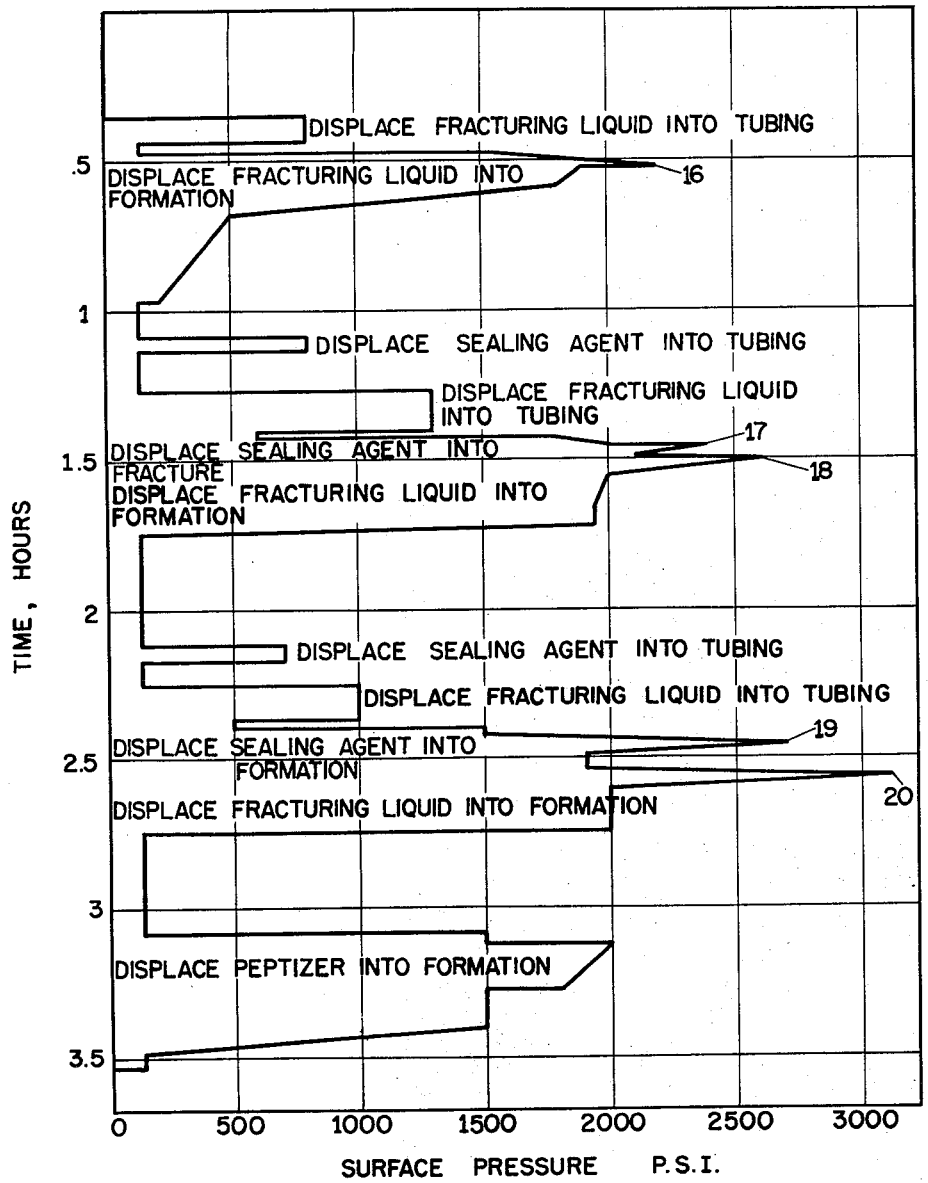

United States Patent Office 2,838,116
Patented June 10, 1958

2,838,116

PRODUCING MULTIPLE FRACTURES IN A FORMATION PENETRATED BY A WELL

Joseph B. Clark, Jr., George C. Howard, and Clarence R. Fast, Tulsa, Okla., assignors to Pan American Petroleum Corporation, a corporation of Delaware Application October 22, 1956, Serial No. 617,377

20 Claims. (Cl. 166—22)

This invention pertains to the treatment of wells to increase the fluid productivity thereof. More particularly, this invention pertains to a method of producing a multiplicity of fractures in the formations penetrated by a well. This application is a continuation-in-part of our application Serial No. 271,394 filed February 13, 1952, now abandoned.

The process of hydraulically fracturing formations within a well involves, generally, the isolation of a zone in a well which is to be fractured and the subsequent injection of a viscous low-penetrating liquid into that zone at high pressure to produce a fracture deep in the formation. The process has, in general, been used to produce a single fracture, since the pressure required to initiate a fracture is generally greater than the pressure required to produce additional fracturing at that elevation, i. e., to extend a fracture, and since typically one point in the formation is weaker than all other points.

It is an object of this invention to provide an improved method of hydraulically fracturing formations wherein a multiplicity of fractures can be produced at various elevations in a well thereby extending passages into the various formations penetrated by a well. It is a further object of this invention to provide an improved method of hydraulically fracturing formations penetrated by a well wherein a series of fractures of any desired areal extent is produced by first fracturing and then temporarily plugging the fracture so that one or more additional fractures can be produced in the same isolated zone of a well. It is a further object of this invention to provide a method of producing multiple fractures in a confined zone of a well by intermittently injecting with the fracturing liquid a quantity of bridging material which tends to plug any previously produced or existing fractures through which the fracturing liquid is entering the formation so that the fracturing liquid subsequently entering the confined zone will, by the application of high hydraulic pressure, produce another fracture. These and other objects of this invention will become apparent from the following description. In this description, reference will be made to the accompanying drawings in which:

Figure 1 shows in diagrammatic form a cross section of a well having perforated sections and contiguous thereto permeability profiles of this well made before a treatment in accordance with this invention and after such a treatment, and Figure 2 is a pressure diagram taken during treatment of a well in accordance with this invention.

As disclosed in Reissue Patent 23,733, Farris, a fracture may be produced in a permeable formation by placing a low-penetrating or fracturing liquid in a well at the zone to be fractured, and then applying to that liquid a pressure great enough to fracture or break down that formation. A fracturing liquid is considered to be a liquid which, with respect to the natural liquids in the well, such as water or crude oil, has a considerably retarded tendency to filter through the formations. These liquids typically have a considerably greater viscosity or a lower filtrate rate than the natural liquids in the well and, accordingly, they permit a high pressure to be developed in the well as they are injected into the well. Ordinary well fluids have a viscosity at surface temperature, e. g., 70° F., of less than about 10 centipoises, usually about 1 or 2 centipoises. Viscosities are, of course, lower at formation temperatures. A fracturing liquid, by contrast, in the case of a substantially Newtonian liquid, has a viscosity of greater than about 30 centipoises, typically, from about 75 to several thousand centipoises or higher. A Newtonian liquid viscosity in the range of 1000–5000 centipoises as measured on a Halliburton viscosimeter, as described in U. S. Patent 2,122,765, Weiler, is preferred. Liquids having higher viscosities can be employed but their pumpability is lowered, increasing handling difficulties. The fracturing liquid may be a Newtonian liquid such as heavy crude or refined oils, or it may be a base liquid made to be viscous or have a low filtrate rate by the addition or inclusion of certain solids such as colloids, e. g., asphalts and soaps. The fracturing liquid may be aqueous or nonaqueous but is preferably compatible with the fluids in the formation. For example, in an oil and gas producing formation, the fracturing liquid is desirably a heavy crude or refined hydrocarbon such as a heavy fuel oil, e. g., number 5 or 6 fuel oil, or is made from a hydrocarbon such as crude oil or a refined hydrocarbon such as gasoline, kerosene, or the like. The viscosity of this liquid may be increased and its filtrate rate reduced by various additives. Similarly, it may be gelled by a number of means such as by the addition of metallic soaps or the addition of a high molecular weight polymer such as polypropylene. Likewise, natural and synthetic gums, as well as resins such as polyacrylates, may be used to produce a viscous fracturing liquid. A commonly used gelling agent for hydrocarbons consists of the salts of fatty acids, particularly the metallic soaps which have the ability to form hydrocarbon gels at atmospheric temperature. A suitable soap of this type, a 2:1:1 mixture of the aluminum soaps of coconut fatty acid, oleic acid, and naphthenic acid, has been widely used by the Chemical Corps of the U. S. Army and is known as "napalm." Such soaps have been described in an article entitled "Napalm," Industrial and Engineering Chemistry, vol. 38, No. 8, page 768. Various other combinations of the aluminum soaps of saturated and unsaturated fatty acids have been used. One highly satisfactory hydrocarbon gelling agent has been made from 30 parts of the aluminum soaps of coconut fatty acids, 65 parts of the aluminum soap of oleic acid, and 5 parts of the aluminum soap of naphthenic acid. Still other soaps of this type now have made from the aluminum soaps of coconut fatty acids and tall oil fatty acids in various proportions—typically, about one-half soaps of coconut fatty acids and one-half soaps of tall oil fatty acids.

In water and gas producing formations water-base fracturing liquids are sometimes used. Typical water-base fracturing liquids include generally a major proportion of water and a small amount of a hydrophilic colloid such as water-soluble or water-dispersible gums, starch, or the like. Such fracturing fluids are described in detail in, for example, U. S. Patents 2,596,137, Fast, and 2,689,009, Brainerd et al. Other fracturing liquids including emulsions of oily liquids with water and/or acids such as hydrochloric acid and a suitable emulsifying or stabilizing agent are often used. This invention is thus not limited to any specific fracturing liquid.

A preferred fracturing liquid is one having, in addition to a suitable formation propping agent, a low filtrate rate, and sufficient viscosity, e. g., 2–10 centipoises or greater, to retard the settling of the propping agent and other finely divided solids such as bridging material. It is, however, not too viscous to be easily pumped. A filtrate rate of less than about 100 cc., preferably less than about 10 cc., in the standard A. P. I. filtration instrument described in Section IV of A. P. I. RP 29, Third Edition, May 1950, is usually employed. Fracturing liquids having a higher filtrate rate can be used but they are generally considered less economical. This low filtrate rate is generally attained by adding colloidal solids such as asphalt soap or starch to the fracturing liquid. Some liquids including certain crude oils and refined oils such as fuel oil have sufficient colloids such as petroleum pitch or asphalt to produce a low-filtrate rate fracturing liquid without the addition of other colloidal solids. The viscosity of an otherwise low-filtrate rate fracturing liquid may be varied over a wide range by use of varying amounts of additives by emulsification or by various combinations of ingredients, as indicated above, to produce a fracturing liquid which possesses the proper physical properties as is well-known in the art. Similarly the filtrate rate of a liquid which has a proper viscosity may be controlled by the use of various low-filter-loss additives including, for example, colloids which disperse in the liquid.

As disclosed in the above-mentioned Reissue Patent 23,733, the fracturing liquid typically contains a dormant or delayed-action solvent or gel breaker or the formation fluids act as a solvent to reduce the viscosity and/or increase the filtrate rate of the fracturing liquid so that, after that liquid has entered the formation fracture or perhaps penetrated the adjacent pores of the formation a slight amount, and after ejection of the liquid is completed, it is reverted to a liquid which readily flows from the formation with the formation fluids when the treated well is subsequently produced. The fracturing liquid also contains a propping agent, typically sand, for holding a fracture open. The propping agent is added to the fracturing liquid in a paddle or other batch mixer as the fracturing liquid is being made up or it may be added with a special blender as the fracturing liquid is being injected into the well. This propping agent is blended in either case at the rate of about ½–10 pounds, typically at about 2 pounds, per gallon of fracturing liquid.

A well rounded sand, typically a sand having a Krumbein roundness of at least 0.7, is preferred. Roundness in this range or lack of angularity appears to decrease the tendency to bridging of the sand or "sanding out" in the fracture whereby the sand is filtered out of the fracturing liquid and deposited in or adjacent to the well. The size of propping agent also is important, particularly with regard to the size of the bridging material. The propping agent must pass through the fracture but the bridging material must bridge, i. e., not pass through the fracture. In addition to the difference in roundness, the bridging agent typically being more angular than the propping agent, the formation props desirably have a narrow particle size range so that the overburden load is carried equally by each of the particles. We have found that props having a wide particle size range will not support as much load without crushing as substantially uniform particles. Accordingly, the propping agent preferably has a particle size distribution of less than about 40 mesh units, typically less than about 20 mesh units. Sand in the size range 10–60 mesh, U. S. sieve (through 10 and retained on 60 mesh sieve), is used. A narrower range, e. g., 40–60, 20–40, and particularly 16–20 mesh, is preferred.

The bridging materials may be, in general, any of the types used in the drilling fluid art. That is, they may be (1) fibrous—pliable, stringy materials which tend to entangle or mat in or over a crevice; (2) granular—angular, rigid materials which tend to bridge against each other in a crevice without being distorted appreciably; and (3) lamellated—materials formed of thin sheets or flakes. The Krumbein roundness of the bridging material is in each case substantially less than the Krumbein roundness of the propping agent. A Krumbein roundness of less than 0.3 is generally desired. A granular bridging material having a Krumbein roundness of less than about 0.1 is preferred. It has particles larger than the propping agent and has a broader range of particle sizes. Particles, particularly granular particles between about 2½ and about 200 mesh U. S. sieve, including particles within the intermediate range, may be used. Granular particles in and distributed throughout the particle size range of 4–100 mesh are preferred. This wide range of particle sizes appears desirable so that an impermeable bridge rather than a filter is formed. A distribution in which the particles in the range of 4–10 mesh U. S. sieve constitute about one-half of the bridging material, the remainder being in the range 10–100 mesh, has been found highly desirable.

The bridging materials are of a temporary nature, i. e., they are capable of being removed from the fractures and from a well. A bridging material which is solid at atmospheric temperature but melts at formation temperature is an example. A preferred bridging material is one which may be removed from the fracture and the well by a solvent such as a strong acid or base or a petroleum solvent, or which is dissolved within the formation as by fluids indigenous to the formations being fractured. Among bridging materials which are temporary and which can be removed from a formation by one of these means are rock salt, a number of the harder waxes such as flaked or granulated beeswax, carnauba wax, shellac wax, microcrystalline hydrocarbon wax, and the like. Fats and hardened oils, for example, highly hydrogenated oils including animal oils, vegetable oils such as soybean oil, cottonseed oil, or the like, and mineral oils such as cup greases or the like are also contemplated. Some of the coal tar derivatives such as naphthalene and anthracene are quite satisfactory, being solid at atmospheric temperatures and being soluble (dissolved or sublimed) in well fluids such as crude oil and methane.

These granular bridging materials are dispersed or slurried in a carrier liquid. The carrier liquid typically has the same composition as the fracturing liquid previously described. The bridging material may be dispersed in the carrier liquid by circulating the carrier liquid in a tank, by stirring the carrier liquid and adding the bridging material, or by adding the bridging material in a jet-type mixing apparatus as the carrier liquid is being injected into the well.

The concentration of bridging material in the carrier liquid may be varied over a substantial range depending, among other things, upon the consistency of the carrier liquid, the solubility of the bridging material in the carrier liquid, and upon the size and shape of the bridging material. We have found that the bridging material will produce a bridge over a fracture more rapidly the higher the concentration of the bridging material in the carrier liquid. The amount of bridging material is, however, limited in that the pumps used to inject the carrier liquid into the well do not have the ability to pump high concentrations of bridging material. Normally, however, the concentration is not critical, and is desirably as high as can conveniently be pumped. Using naphthalene having a gradation of particles in the range of 4 mesh and smaller as a bridging material, for example, it has been found that at about 80° F. after the carrier liquid has dissolved about 50 pounds of naphthalene per 42-gallon barrel of carrier liquid, between about 50 and about 300 pounds, preferably between about 100 and 200 pounds, of naphthalene may be added to a barrel of the carrier liquid and that in most cases from about ½ to about 2 barrels of this slurry will seal a fracture. Preferably, however, from about 2 to about 10 barrels, typically about 5 barrels, of the slurry are injected into the well following directly or indirectly after the first quantity of fracturing liquid.

The well is first prepared for fracturing by isolating a portion or zone of the well in which it is desired to produce a fracture. This is typically accomplished by setting one or more packers in the well to limit the amount of formation exposed to the high pressure liquids. The fracturing liquid is then prepared preferably at the well site as described above. The amount of fracturing liquid prepared or otherwise available at the well site is preferably sufficient to make several deep-penetrating fractures in the confined zone. As much as several thousand barrels are sometimes available. A first quantity of fracturing liquid comprising from about 10 to 100 or more barrels, desirably containing sand propping agent, is then injected into the well. A few barrels of crude oil or other high-penetrating liquid may be injected into the well ahead of the fracturing liquid to test the connections and the packer or packers for leaks and in some cases to break down or produce an initial fracture in the formation. The fracturing liquid is pumped down either the tubing or the casing or both into the confined zone of the well. During its passage, it may displace the well fluids and any other-penetrating liquids back into the formation, or they may be displaced around an upper packer before the packer is set. When the fracturing liquid has filled the zone which is to be isolated and the packers have been set, more fracturing liquid or a follower liquid such as unmodified crude oil or water is pumped into the well on top of the liquid already in place, so that there is a continuous column of liquid from the confined zone to the pump. With the well thus filled, the fracturing or follower liquid is pumped at a rapid rate, preferably within the range of from about 1.5 to about 75 barrels per minute or more, typically about 20-40 barrels per minute. Due to the high viscosity and/or low filtrate rate of the fracturing liquid, it does not leak away into the formation rapidly, and, accordingly, due to the rapid injection rate, and high bottom-hole pressure, a formation fracture is produced. The pressure at the formation required to produce such a fracture varies in the different areas but it is generally less in pounds per square inch than the depth of the formation in feet. The surface pressure may be lower due to the difference in elevation and the pressure caused by the column of liquid, or, at high-injection rate, it may be higher due to friction in the well. The creation of a fracture is generally easily recognized. After a fracture is created the bottom-hole pressure and even the pump discharge pressure will generally not rise further, even though the pump rate is constant or is increased. In most cases, if the pressure versus volume of liquid injected into the formation is plotted, or if the pressure versus time is plotted, this fracture is indicated by a break in the curve. That is, after the fracture has been produced, there is a decrease in the total resistance to fluid flow of the fracturing liquid. Depending upon the length of fracture desired, any amount of fracturing liquid may be injected into the fracture by continued pumping.

When the fracture is extended to the desired length, the desired quantity, typically about 5 barrels of the fracture sealing liquid described above, is injected into the well following the fracturing liquid. In some cases, a follower fluid such as crude oil may be pumped into the well after the fracturing liquid and ahead of the fracture sealing fluid if desired to displace the fracturing liquid into the formation. When this slurry of fracture sealing or plugging agent is pumped to the bottom of the well and displaces the first quantity of fracturing liquid from that area it seals the first fracture and other permeable zones exposed and then the pressure in the well and at the surface typically rises rather rapidly. Occasionally, this pressure rise is sufficient to produce one or more additional fractures in the formation adjacent the confined zone before all of the slurry has been displaced from the tubing.

A quantity of follower fluid such as crude oil or other high-penetrating liquid may be injected into the well to displace or force the fracture sealing agent to the bottom of the well. Preferably, however, this slurry is followed immediately by a second quantity of fracturing liquid having substantially the same composition as the original quantity of fracturing liquid. This second quantity of fracturing liquid displaces the slurry of fracture sealing agent down the well and into the confined zone. By continued rapid pumping of the fracturing liquid the pressure is again raised to a point where the formation will again fracture. Typically, the second fracture occurs at a higher pressure than the first fracture since the weakest section of the formation appears to fracture first. By continued pumping on the liquid column, the area or extent of the second fracture or passage formed in the formation may be extended as above described. Obviously the alternate injection of fracturing liquid and fracture sealing agent which seals any fracture created by that fracturing liquid can be continued until the number of fractures in a formation is considered adequate. The well tubing may thus contain at one time a vertically-connected series of alternate slugs or columns of fracturing liquid and fracture sealing agent, with or without intermediate slugs of crude oil or other isolating liquids, which together form a single liquid column from the pump to the isolated zone. The number of fractures produced depends largely upon the number and thickness of potentially productive formations. Fractures along the well at from about 2 to about 10 foot spacing depending upon the permeability and continuity of the formations are considered desirable for adequate drainage of the formations.

Since the fracturing liquid and the bridging material impermeabilize or plug the fractures, these materials must be removed from the formation and from the well after the desired number of fractures are created so that the formation fluids can be produced through the fractures. The last of the fracturing liquid may, therefore, be followed either directly or indirectly by a peptizer or solvent which reduces the viscosity and/or gel strength of the fracturing liquid and dissolves the bridging material. Such peptizers or solvents comprise generally strong acids and surface-active agents including the oil-soluble amines and the oil-soluble sulfonates. A peptizer may be injected into the formation in a concentrated form, but we prefer that it be diluted with a compatible fluid, e. g., oil, crude or refined, and displaced into the formation by injecting a suitable fluid such as crude oil into the well behind it.

The amount of peptizer may be varied over a substantial range, but normally between about 0.5 and about 5 percent, preferably about 1 percent, of the peptizer, based upon the volume of the fracturing liquid, is injected through the isolated zone into the formation. It causes the viscosity of the fracturing liquid to break within about a day or less. That is, the viscosity of the fracturing liquid is reduced within a short time to the viscosity of the base liquid, typically 1–3 centipoises. Alternatively, we incorporate directly in the fracturing liquid a delayed action or dormant peptizer which effectively reverts the liquids and solids after a period long enough to permit all of the fracturing liquid to be injected into the well.

Various peptizers of this type for fracturing liquids have been proposed. These include, in the case of the aluminum soap-hydrocarbon gels, such materials as water and the lower alcohols, e. g., methanol. A small percentage of water, for example, from about 0.5 to 3 percent of water, dispersed in the napalm-type hydrocarbon gels above described has been found effective as a delayed action peptizer. In some of these gels, such as emulsion gels, in which an acid-sensitive emulsifying agent (e. g., Tween 20 manufactured by Atlas Powder Company) is provided, the emulsifying agent may be destroyed by contact with a strong acid. Consequently, these viscous emulsion gels may be broken by the addition or incorporation of acids such as hydrochloric acid in the fracturing liquid. A number of the commonly used fracturing liquids such as the heavy fuel oils, e. g., No. 5 or No. 6 fuel oil, are reverted from low-penetrating to high-penetrating liquids and the oil-soluble bridging materials are dissolved by contact with the formation crude oils or gas so that extraneous peptizers or solvents are not required. Also, the gels, particularly the napalm-type gels, have been found to break when placed in contact with the formation fluids. Accordingly, by one or more of these means, the fracturing liquid in the formation is reduced or spontaneously reverted to a sol or low-viscosity liquid which flows more freely than the original fracturing liquid or generally, like formation liquids, and which can be removed from the formation through the fractures and passages produced by the fracturing liquid as the well is produced. The bridging material, which as above described is preferably of a temporary nature, may be removed by melting or by introduction of an extraneous solvent, or in the preferred embodiment, the bridging material being soluble in the well fluids, it is removed as the well is produced.

As an example of the effectiveness of the method herein described for producing multiple fractures in a formation and increasing the productivity thereof, a well in the Sholem Alechem Field, Oklaholma, which produced 63 barrels of oil per day was fractured a multiplicity of times in accordance with the above procedure. In this process a permeability survey of the well was first made to determine the location of permeable zones in the well. A permeability log before treatment is indicated at the left and juxtaposed to the diagrammatic representation of the well shown in Figure 1. The permeability in the well prior to treatment was, as indicated by the log, all in the zone between about 5552 and about 5575 feet. After the permeability survey, a retainer 9 was run into the well on 2½-inch tubing 10 and the retainer was set in the casing 11 at 5480 feet. The casing had been perforated at zones 12, 13, 14, and 15. The total depth of the well as about 5650 feet. In the treatment of this well, a 2:1:1 napalm-type soap-kerosene gel was prepared by mixing 5 percent soap in the kerosene and adding about 1 percent water and about 0.5 pound per gallon of 16-mesh Ottawa sand. One barrel of this gel weighed about 260 pounds. This produced a fracturing liquid having about 5000 centipoise viscosity. Twenty barrels of this fracturing liquid were displaced down the well at high rate. When the well fluids were displaced from the well and the gel contacted the formation, a pressure peak 16 of 2200 p. s. i. developed at the pump discharge as indicated in Figure 2, and at that pressure a first pressure break or drop occurred, indicating that a first fracture had been initiated. The pump discharge pressure dropped back to about 1900 pounds at which pressure all of the fracturing liquid was injected into the formation. Eight barrels of fracture sealing agent consisting of 6 barrels of the above-mentioned fracturing liquid containing 1200 pounds of granulated naphthalene were then injected into the well on top of the fracturing liquid. This granulated naphthalene before it was mixed in the fracturing liquid had a distribution of particle sizes in the range 4–100 mesh, U. S. sieve. The slurry of naphthalene granules in the fracturing liquid was displaced to the bottom of the well by injecting into the tubing following the slurry, 20 barrels of plain fracturing liquid, i. e., fracturing liquid containing sand but no bridging material. When the slurry filled the well in the area of the first fracture, a second pressure peak 17 of about 2400 p. s. i. developed at the pump discharge. At this pressure a second fracture occurred at which time the pressure decreased to about 2100 p. s. i.. Since all of the slurry had not been injected into the well at the time that second fracture was sealed, a third pressure peak 18 developed immediately. At a surface pressure of about 2600 p. s. i. the formation fractured for a third time and the pressure dropped to about 2000 p. s. i. at which pressure the second quantity of fracturing liquid entered the formations.

A second quantity of fracture sealing agent consisting of 6 barrels of the above-mentioned fracturing liquid plus 1200 pounds of granulated naphthalene as above described were then injected into the well following the second quantity of fracturing liquid, and displaced to the bottom with 20 barrels of the plain fracturing gel. When the slurry of naphthalene granules and fracturing liquid hit the formation the third fracture was sealed and a fourth pressure peak 19 developed. At a pressure of about 2700 p. s. i. the formation broke down and a fourth fracture was produced. Before all of the sealing agent was injected into that fracture, it was sealed and a fifth pressure peak 20 developed. At about 3100 p. s. i. the formation broke down for the fifth time and all of the third quantity of fracturing liquid was injected into the formation at about 2000 p. s. i.

Following the third quantity of plain fracturing liquid, a peptizer solution consisting of 45 gallons of dibutylamine in 140 barrels of crude oil was pumped into the formation at a pump discharge pressure in the range of about 1800–2000 pounds, the pressure gradually decreasing as the peptizer was injected. This peptizer solution was displaced from the tubing and out into the formation by pumping into the tubing on top of the peptizer solution 40 barrels of crude oil. Following the treatment and after several days when the well was on sustained production at a rate of 262 barrels of oil per day, a permeability survey was again conducted. The log of the permeability survey after treatment is shown in Figure 1 at the right and juxtaposed to the diagrammatic representation of the bottom of the well. From this log it will be noted that the permeability prior to treatment in the zone 5550–5575 feet remained substantially unchanged. It will be noted also that the permeability was increased in the zones 21, 22, 23, 24, and 25.

From the foregoing it can be seen that we have described a highly satisfactory method of producing multiple fractures in a formation without isolating each zone to be fractured as by the setting of packers above and below each selected zone before the fracture is created. It can also be seen that each of the fractures may selectively be extended to any desired area in the same manner that a single fracture may be extended. This description has been made by reference to certain examples but the invention should be understood not to be limited by such examples. Instead, it should be construed as limited only by the scope of the appended claims.

We claim:

1. In a method of producing multiple fractures in a formation penetrated by a well, the steps of introducing into said well a first quantity of a fracturing liquid, said first quantity of a fracturing liquid comprising a slurry of a propping agent in a carrier liquid, pumping said first quantity of fracturing liquid into said formation at a pressure sufficient to produce a first fracture in said formation, introducing into said well following said first quantity of fracturing liquid a temporary fracture sealing agent comprising a slurry of bridging material, said bridging material comprising solid particles larger than said propping agent so that said bridging material will bridge in and plug said first fracture, pumping said temporary fracture sealing agent into said first fracture until said first fracture is plugged, introducing into said well following said temporary fracture sealing agent a second quantity of a fracturing liquid, pumping said second quantity of fracturing liquid into said formation at a pressure sufficient to produce a second fracture in said formation, said fracturing liquid having initially a retarded tendency to filter into said formation and being reverted within said formation to a liquid which flows more freely from said formation, and thereafter producing said well to remove said bridging material from said first fracture and to remove fracturing liquid from said first and said second fractures.

2. A method of producing multiple fractures in a formation penetrated by a well including the steps of introducing into said well a first quantity of a fracturing liquid, said first quantity of a fracturing liquid comprising a slurry of a propping agent in a carrier liquid, said carrier liquid having a filtrate rate substantially lower than the filtrate rate of the liquids produced by said well and having sufficient viscosity to retard the settling of said propping agent and to carry it into a fracture in said formation, the filtrate rate of said fracturing liquid being capable of reversion to a substantially higher filtrate rate within said formation, pumping said first quantity of a fracturing liquid into said formation at a pressure sufficient to produce a first fracture in said formation, introducing into said well following said first quantity of fracturing liquid a fracture sealing agent comprising a slurry of bridging material, said bridging material comprising solid particles having a gradation of particle sizes greater than the gradation of particle sizes in said propping agent, said bridging material also including particles larger than the largest particles of said propping agent but not too large to pump and sufficient particles of intermediate and smaller size to produce a plug in said first fracture, at least the smaller of said particles of bridging material being capable of reversion in said well to a fluid which flows out of said fracture and said well, pumping said fracture sealing agent into said first fracture until said first fracture is plugged, introducing into said well following said fracture sealing agent a second quantity of a fracturing liquid, said second quantity of a fracturing liquid comprising a slurry of a second quantity of a propping agent in a second quantity of a carrier liquid, said second quantity of a carrier liquid having a filtrate rate substantially lower than the filtrate rate of the liquids produced by said well and having sufficient viscosity to retard the settling of said second quantity of a propping agent and to carry it into a fracture in said formation, the filtrate rate of said second quantity of a fracturing liquid being capable of reversion to a substantially higher filtrate rate within said formation, pumping said second quantity of a fracturing liquid into said formation at a pressure sufficient to produce a second fracture in said formation, and reverting said particles of bridging material, said first quantity of a fracturing liquid and said second quantity of a fracturing liquid so that when said well is produced the reversion liquids will be removed from said formation.

3. A method according to claim 2 in which said smaller particles of bridging material revert spontaneously to a fluid which flows out of said fracture and said well after a period of time sufficient to produce said second fracture.

4. A method according to claim 3 in which said bridging material has a melting point above the temperature of said formations.

5. A method according to claim 3 in which said bridging material is soluble in the fluids in said formations.

6. A method according to claim 3 in which said bridging material is naphthalene.

7. A method according to claim 6 in which said naphthalene has a gradation of particle sizes covering substantially the range of about 4–100 mesh, U. S. sieve.

8. A method of producing multiple fractures in a formation penetrated by a well including the steps of injecting into said formation at a first formation-breakdown pressure a first quantity of fracturing liquid to produce a first fracture in said formation, said fracturing liquid comprising a slurry of sand in a viscous carrier liquid, injecting into said first fracture sufficient fracture sealing agent to plug said first fracture, said fracture sealing agent comprising a slurry of bridging material, said bridging material having a particle size distribution sufficiently wide to make said plug substantially impermeable, at least the smaller of said particles being capable of reversion in said well to a fluid which flows out of said fracture and said well, and after said first fracture is sealed injecting into said formation at a second formation-breakdown pressure a second quantity of said fracturing liquid to produce a second fracture in said formation, said bridging material including particles larger than the largest particles of said sand whereby said bridging material will bridge in and plug a fracture which passes said sand.

9. A method according to claim 8 in which said smaller particles of bridging material revert spontaneously to a fluid which flows out of said fracture and said well after a period of time sufficient to produce said second fracture.

10. A method according to claim 8 in which said fracture sealing agent comprises a slurry of said bridging material in said carrier liquid.

11. A method according to claim 8 in which said bridging material is soluble in the fluids in said formations.

12. A method according to claim 8 in which said bridging material is naphthalene.

13. A method according to claim 8 in which said naphthalene has a gradation of particle sizes covering substantially the range of about 4–100 mesh, U. S. sieve.

14. A method of producing multiple fractures in a formation penetrated by a well including the steps of injecting into said formation at a first formation-breakdown pressure a first quantity of fracturing liquid to produce a first fracture in said formation, said fracturing liquid comprising a slurry of sand in a carrier liquid, said carrier liquid having a filtrate rate lower than the filtrate rate of the liquids produced by said well and sufficient viscosity to carry said sand into a fracture in said formation and being capable of reversion within said formation to a fluid which flows more freely from said formation, said sand consisting of particles in the size range 10–60 mesh, U. S. sieve, injecting into said first fracture sufficient bridging material in a liquid medium to seal said first fracture, said bridging material having particles larger than the largest of said sand particles and sufficient smaller particles with sufficient particle size distribution to produce a substantially impermeable plug in said first fracture, said smaller particles being soluble in said liquids produced by said well, and after said first fracture is sealed injecting into said formation at a second formation-breakdown pressure a second quantity of said fracturing liquid to produce a second fracture in said formation.

15. A method according to claim 14 in which said liquid medium comprises a quantity of said carrier liquid.

16. A method according to claim 14 in which said bridging material consists of particles throughout substantially the particle size range 4–100 mesh, U. S. sieve.

17. A method according to claim 14 in which said carrier liquid comprises a viscous fuel oil and said bridging material comprises naphthalene.

18. A method according to claim 17 in which said sand consists of particles of about 16 mesh size, U. S. sieve, and said naphthalene consists of particles throughout substantially the particle size range 4–100 mesh, U. S. sieve.

19. A method according to claim 18 in which said sand has a Krumbein roundness of greater than about 0.7 and said naphthalene has a Krumbein roundness of less than about 0.3.

20. A method of making multiple fractures in an oil-producing formation penetrated by a well including the steps of introducing into a confined zone in said well a fracturing liquid, said fracturing liquid comprising a slurry of sand in a carrier liquid, said carrier liquid having a filtrate rate lower than the filtrate rate of any of the liquids produced by said well and being capable of reversion within said formation to a fluid which flows more freely than the original carrier liquid from said formation, said sand consisting of particles within the size range 10–60 mesh, U. S. sieve, and a Krumbein roundness greater than about 0.7, applying sufficient pressure to said fracturing liquid to initiate a first fracture in said formation, continuing to apply pressure to said fracturing liquid to extend said first fracture, introducing a quantity of bridging material into said fracturing liquid, said bridging material consisting of oil-soluble granules within and throughout substantially the complete size range 4–100 mesh, U. S. sieve, and having a Krumbein roundness of less than about 0.3, said quantity of bridging material being sufficient to seal said first fracture, injecting said fracturing liquid containing said bridging material into said first fracture to seal said fracture, and thereafter continuing to inject said fracturing liquid into said confined zone at a pressure sufficient to produce another fracture in said formation.

References Cited in the file of this patent

UNITED STATES PATENTS 2,734,861     Scott et al. _____ Feb. 14, 1956